United States Patent
Ferrandez

(10) Patent No.: US 8,984,852 B2
(45) Date of Patent: Mar. 24, 2015

(54) HULLER DEVICE

(75) Inventor: Joseph Ferrandez, Narbonne (FR)

(73) Assignee: Societe Occitane de Maintenance (SOMCA), Narbonne (FR)

( * ) Notice: Subject to any disclaimer, the term of this patent is extended or adjusted under 35 U.S.C. 154(b) by 192 days.

(21) Appl. No.: 13/512,771

(22) PCT Filed: Nov. 22, 2010

(86) PCT No.: PCT/FR2010/052478
§ 371 (c)(1),
(2), (4) Date: Jun. 22, 2012

(87) PCT Pub. No.: WO2011/067498
PCT Pub. Date: Jun. 9, 2011

(65) Prior Publication Data
US 2012/0255270 A1    Oct. 11, 2012

(30) Foreign Application Priority Data
Nov. 30, 2009   (FR) ...................................... 09 58477

(51) Int. Cl.
*A01D 46/00*   (2006.01)
*A23N 15/02*   (2006.01)

(52) U.S. Cl.
CPC .................................. *A23N 15/025* (2013.01)
USPC ......................................................... 56/330

(58) Field of Classification Search
USPC ............. 56/328.1, 329, 330, 332, 340.1, 16.5
See application file for complete search history.

(56) References Cited

U.S. PATENT DOCUMENTS

| 3,727,388 | A | * | 4/1973 | Smith | 56/330 |
| 4,016,711 | A | * | 4/1977 | Claxton | 56/330 |
| 4,172,352 | A | * | 10/1979 | McCarthy et al. | 56/340.1 |
| 4,179,871 | A | * | 12/1979 | Claxton | 56/330 |
| 4,250,700 | A | * | 2/1981 | Horn et al. | 56/330 |
| 6,009,186 | A | | 12/1999 | Gorretta et al. | |
| 2009/0056297 | A1 | | 3/2009 | Pellenc et al. | |

FOREIGN PATENT DOCUMENTS

| DE | 25 19 120 A1 | 3/1976 |
| EP | 0 826 959 A1 | 3/1998 |
| EP | 2 030 514 A1 | 3/2009 |
| FR | 1 033 642 A | 7/1953 |
| FR | 2 796 249 A1 | 1/2001 |

* cited by examiner

*Primary Examiner* — Robert Pezzuto
(74) *Attorney, Agent, or Firm* — Laurence A. Greenberg; Werner H. Stemer; Ralph E. Locher

(57) ABSTRACT

A huller device for hulling bunches of grapes after a harvest or other fruits harvested in bunches by separating the fruit from the stalks, includes two shaking units disposed side by side and defining a vertical space into which the harvest is intended to be directed by gravity. A device for collecting the fruits and the stalks is disposed under the shaking units.

13 Claims, 2 Drawing Sheets

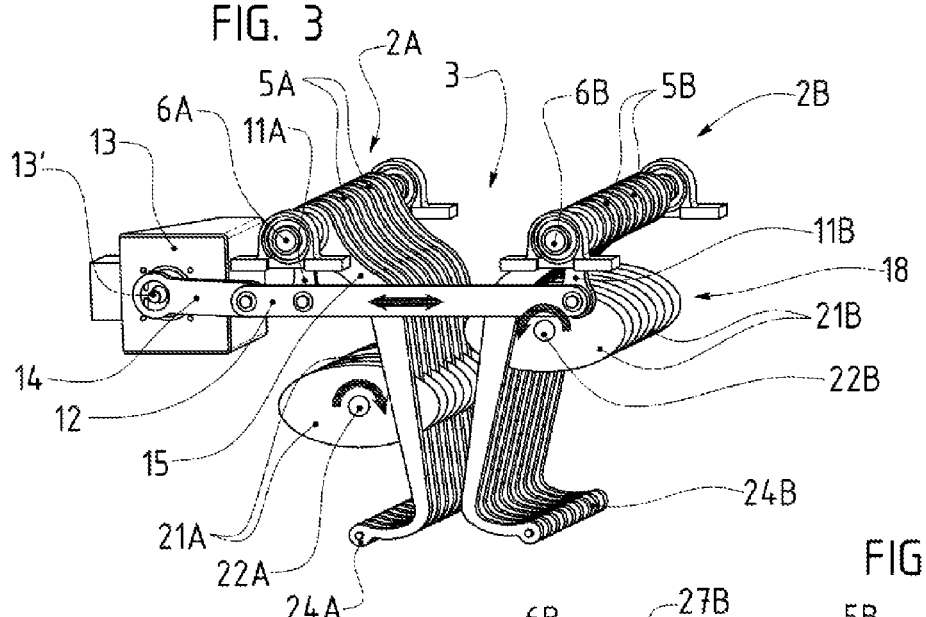
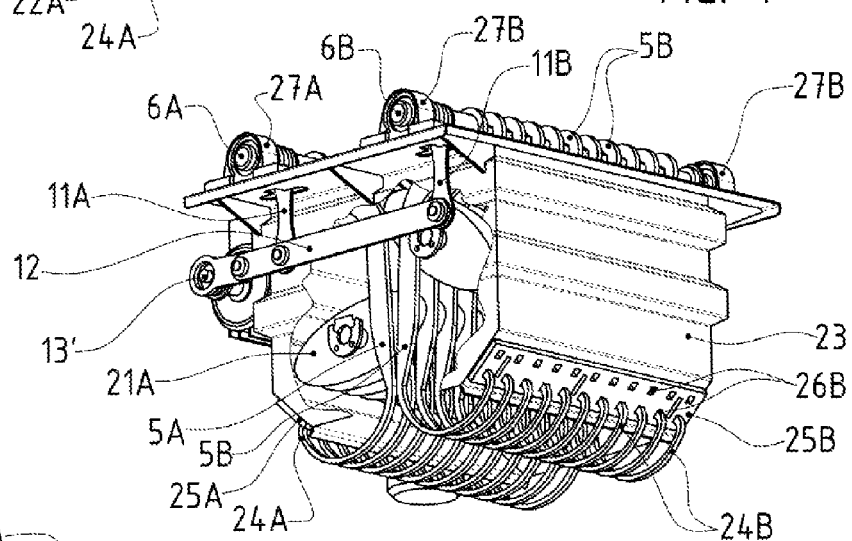
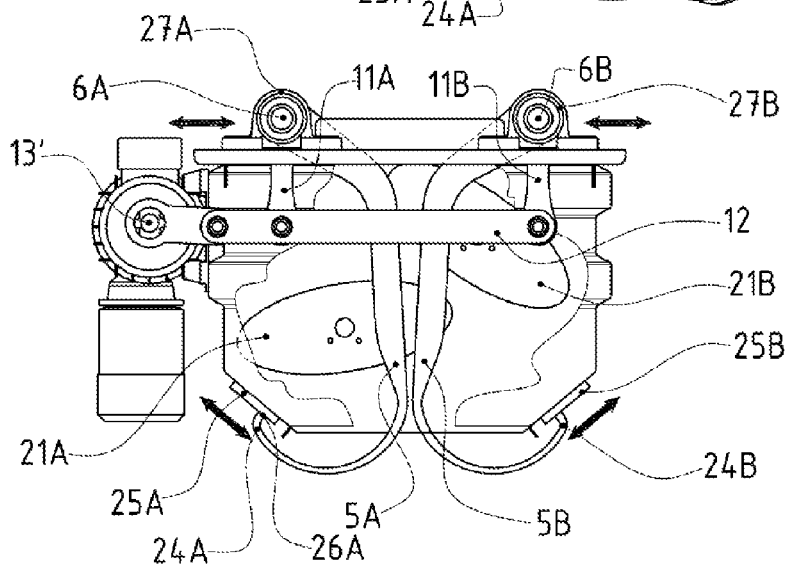

HULLER DEVICE

BACKGROUND OF THE INVENTION

Field of the Invention

The invention relates to a huller device for hulling bunches of grapes after the harvest, or other fruits harvested in bunches, as well as a harvesting machine equipped with such a huller device.

A more particular object of the invention is to separate fruit from stalks.

There is already known from the document EP 2 030 514 a destalking device composed on the one hand of a plane conveyor belt conveying the bunches of grapes from a place of storage, or some other place, and on the other hand a huller device disposed above said belt, on the path taken by the harvest. This huller device comprises two juxtaposed assemblies of superposed separator arms, said arms, which are shaped like hairpins, being mounted to be oscillated at high frequency in a transverse direction by drive means. On contact with the oscillating arms, the fruit from the bunches of grapes are therefore separated from their stalks, both dropping onto the conveyor belt which may, depending on its design, participate in sorting the fruit and the stalks.

This destalking device has drawbacks, notably in that stalks frequently become wedged in the separator arms, which generates a loss of efficiency, and in that it is of relatively large overall size, which complicates its installation on a harvesting machine, for example.

The document DE 2519120 also describes a destalking device which comprises, on a chassis, an endless chain carrying shaking units that it moves horizontally above a receiving endless belt that moves transversely to the direction of movement of said shaking units and that leads onto a transfer belt moving parallel to the movement of said shaking units. The harvest is tipped onto the shaking units which as they are moved longitudinally are animated transversely so as to cause the fruit to drop onto the receiving endless belt, after which they are taken to the transfer belt, which evacuates them, while the stalks remain in the shaking units, notably because of the effect of an upwardly directed flow of air, and are evacuated by means of combs disposed beyond the receiving endless belt. Such a device has drawbacks, apart from its complexity given that it uses at least three transfer paths, it offers poor performance and, above all, is bulky.

BRIEF SUMMARY OF THE INVENTION

An object of the present invention is to propose a huller device able to overcome the various drawbacks referred to above, notably by being compact and of simple design.

Accordingly, the huller device of the invention for hulling bunches of grapes after the harvest, or other fruits harvested in bunches, in other words, for separating the fruit from the stalks, is essentially characterized in that it includes, on the one hand, two shaking units arranged side by side, defining a vertical space into which the harvest is intended to be directed by gravity and, on the other hand, means for collecting the fruit and the stalks, arranged under said shaking units.

According to an additional feature of the huller device of the invention, each of the shaking units comprises a series of vertically oriented, regularly spaced parallel fingers suspended from a horizontal shaft, while the two horizontal shafts of the two shaking units are parallel and connected to drive means enabling transmission to them of an oscillatory pivoting movement so as to drive said fingers in an oscillatory pendular movement.

According to another additional feature of the huller device of the invention, each of the fingers has, on the one hand, starting from the area in which it is fastened to the shaft that carries it, an obliquely oriented segment directed downward and toward the vertical space so that the shaking units form a hopper for receiving the harvest, and, on the other hand, in line with said obliquely oriented segment, a vertically oriented segment.

According to another additional feature of the huller device of the invention, it includes means for adjusting the distance between centers of the shafts of the two shaking units to enable adjustment of the separation of the fingers of one shaking unit relative to the fingers of the other shaking unit.

In the huller device of one particular embodiment of the invention, the end part of each of the fingers is produced in a material having spring qualities, while the rest of the finger is produced in a hard and rigid material, while the end of each of the fingers is connected to the chassis of the huller device via fixing means.

According to another additional feature of the huller device of this particular embodiment of the invention, the fixing means fixing the ends of the fingers to the chassis are rendered mobile to enable adjustment of the tension of said fingers.

In the huller device of another particular embodiment of the invention, the fingers are produced in a hard and rigid material and their free end is connected to the chassis of the huller device via a spring-loaded connection in the direction away from the vertical space.

According to another additional feature of the huller device of the invention, it includes means for driving the stalks operating in said vertical space crossed by the harvest.

According to another additional feature of the huller device of the invention, the means for driving the stalks include mobile elements moved so that at least one of them moves in the vertical space crossed by the harvest in a downward movement, passing between the fingers.

According to another additional feature of the huller device of the invention, the mobile elements consist in parallel disks mounted on a shaft parallel to those of the shaking units and rotated.

The present invention also consists in a harvesting machine that is characterized in that it is equipped with a huller device as defined above.

The advantages and the features of the huller device of the invention will emerge more clearly from the following description, which refers to the appended drawings, which show several nonlimiting embodiments of the invention.

In the appended drawings:

BRIEF DESCRIPTION OF THE SEVERAL VIEWS OF THE DRAWING

FIG. 3 is a partial diagrammatic perspective view of a variant of the same huller device, FIG. 4 is a diagrammatic perspective view of the same variant of the same huller device, and FIG. 5 is a diagrammatic elevation view of the same variant of the same huller device.

DESCRIPTION OF THE INVENTION

The huller device of the invention that is to be described is intended to be mounted on a harvesting machine or installed in a warehouse.

Figure 1:
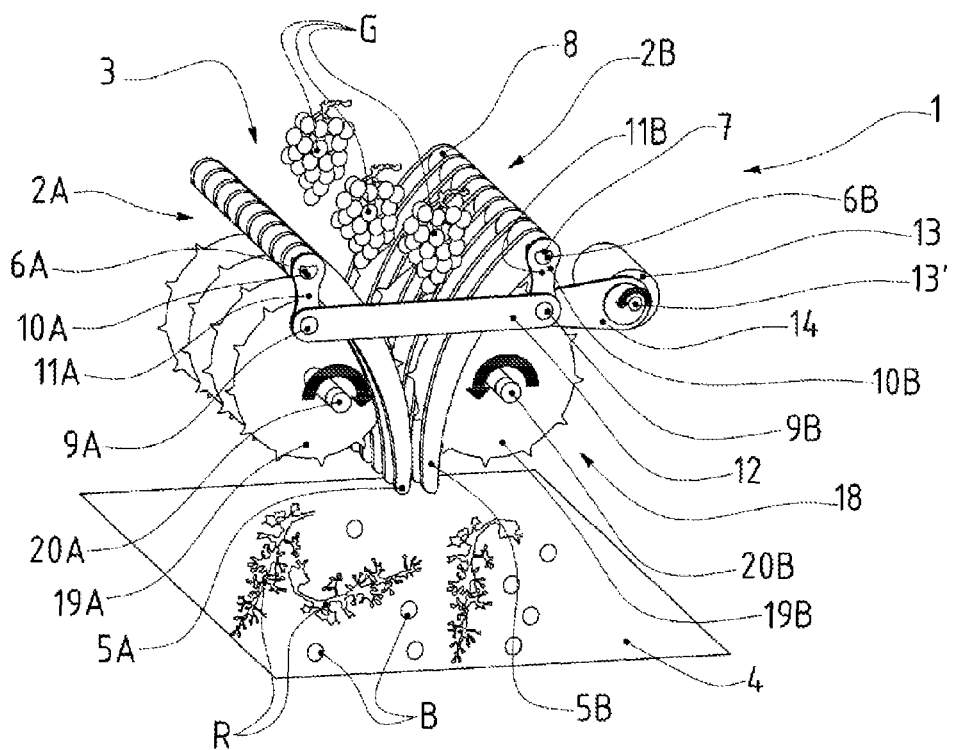
FIG. 1 is a partial diagrammatic perspective view of a huller device of the invention in use.
Figure 2:
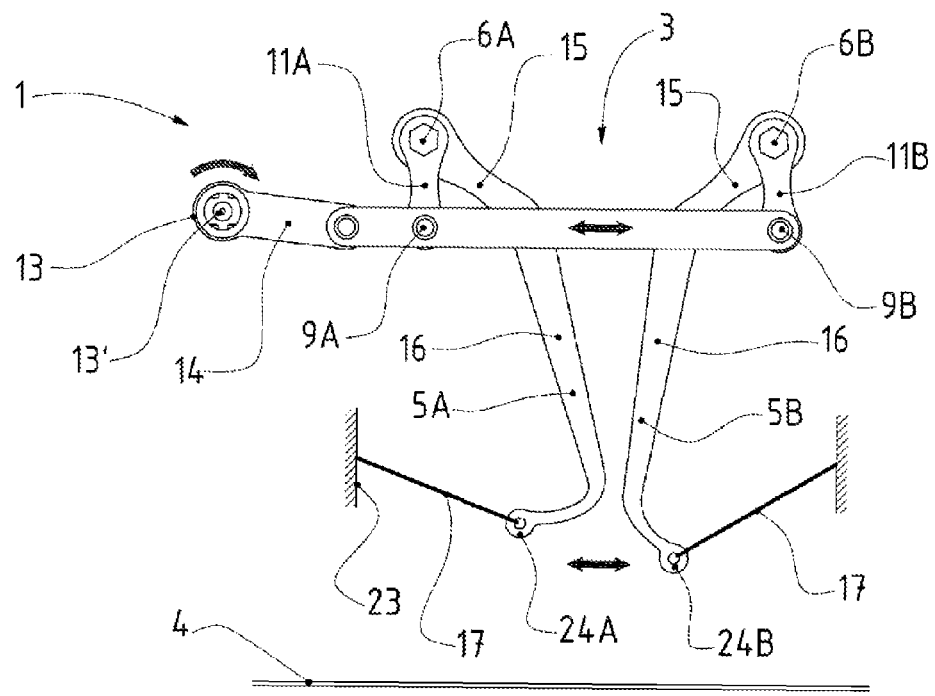
FIG. 2 is a partial diagrammatic elevation view of a variant of the same huller device.

Referring to FIG. 1, it can be seen that a huller device 1 of the invention for hulling bunches of grapes after the harvest includes on the one hand two shaking units 2A and 2B, disposed side by side and facing each other, delimiting a vertical space 3 into which the harvest is intended to be fed by gravity and on the other hand collecting means 4, visible in FIG. 2, which may notably be a conveyor belt disposed under said shaking units 2A and 2B.

Each shaking unit 2A and 2B is preferably composed of a series of parallel fingers 5A and 5B, respectively, of vertical or inclined orientation, suspended from a horizontal shaft 6A and 6B, respectively.

The horizontal shafts 6A and 6B are mounted to pivot while the fingers 5A and 5B are constrained to rotate by means of a flat 7 or, as may be seen in FIG. 2, a non-round (for example hexagonal) coupling opening.

The fingers 5A and 5B are furthermore held apart two by two on the shafts 6A and 6B, respectively, by spacer means 8 such as washers.

Moreover, the ends 10A and 10B of the horizontal shafts 6A and 6B, respectively, are each equipped with a lever 11A and 11B, respectively, constrained to rotate with them, and themselves connected to a link 12 via pivot connections 9A and 9B, respectively.

The link 12 is moreover connected to a motor 13 via a link 14 mounted on the motor 13 via a cam 13'.

Accordingly, by means of the cam 13', the link 14, the link 12 and the levers 11A and 11B, the motor 13 enables transmission of an oscillatory pivoting movement, which may be at a frequency of a few tens of hertz, to the fingers 5A and 5B, which thus oscillate in a pendular movement.

The fruit B on contact with the oscillating fingers 5A and 5B are separated from the stalks R when the bunches of grapes G are tipped into the vertical space 3.

It is seen in FIG. 1 that, in a first embodiment, the fingers 5A and 5B are, in the vicinity of their attachment to the shafts 6A and 6B, of substantially curved shape in such a manner as to create an upward flare designed to enable engagement of the harvest, while their free ends are substantially straight, slightly inclined downward and toward the space 3, so as to reduce the size of the latter.

In FIGS. 2 and 3 there is shown a second embodiment in which the fingers 5A and 5B also have, in the area in which they are fastened to their shafts 6A and 6B, an obliquely oriented segment 15 directed downward and toward the vertical space 3 so that the shaking units 2A and 2B form a flare for receiving the harvest, and, on the other hand, in line with said obliquely oriented segment, a segment 16 of substantially vertical orientation.

In this second embodiment, the fingers 5A and 5B include at their lower free end 24A and 24B, respectively, a curved segment provided at the end with means for attaching a link 17 itself attached to the chassis 23 of the huller device 1.

The link 17 may either be elastic to urge the fingers 5A and 5B in the direction away from the vertical space 3 and to avoid shocks on changes of direction during oscillation or be non-deformable, in which case it is the free end of each of the fingers 5A and 5B that has spring qualities and provides the damping.

The device 1 advantageously also includes means 18 for driving the stalks R operating in said vertical space 3 through which the harvest passes to drive the stalks R and prevent them remaining wedged in the vertical space 3, which enables the descent of the bunches to be timed and congestion to be avoided.

In an embodiment of the invention visible in FIG. 1, the driving means 18 are constituted by two sets of coaxial disks 19A and 19B including teeth, each mounted on a horizontal shaft 20A and 20B, fixed to the chassis, not shown.

These shafts 20A and 20B are parallel and positioned so that the disks 19A cooperate with the series of fingers 5A and the disks 19B cooperate with the series of fingers 5B, the disks 19A being interleaved between the fingers 5A and the disks 19B being interleaved between the fingers 5B, so as to penetrate partly into the vertical space 3.

The disks 19A and 19B are driven in rotation in opposite directions and so that their edge moves downward in the vertical space 3.

In the FIG. 1 embodiment, the disks 19A and 19B are not interleaved between each pair of the fingers 5A and 5B, respectively, but between one pair in two, and in a manner offset for the disks 19A relative to the disks 19B, so that they can go deeper into the vertical space 3 without risk of contact of the disks 19A with the disks 19B.

In the FIG. 3 embodiment, the means 18 for driving the stalks are constituted by two sets of contrarotating disks 21A and 21B of oblong or ellipsoidal general shape mounted on a horizontal shaft 22A and 22B, respectively.

The disks 21A and 21B are interleaved between each pair of the fingers 5A and 5B and to prevent all risk of contact between the disks 21A and the disks 21B the shafts 22A and 22B are offset vertically.

It will be noted that, in a variant, it is equally possible for the shafts 22A and 22B to be disposed at the same level, or at very substantially equal levels, in which case the disks 21A and 21B are offset angularly relative to each other.

Such a configuration is shown in FIGS. 4 and 5, for example.

In these FIGS. 4 and 5 it may also be seen that, in a variant, the free ends 24A and 24B of the fingers 5A and 5B, respectively, are fastened to the chassis 23 by way of an interface plate 25A and 25B, respectively, in which are formed openings 26A and 26B, respectively, divided into two levels, although this is not limiting on the invention, to enable, according to whether the ends 24A and 25B are engaged in the openings 26A and 26B of either level, for fastening purposes, adjustment of the tension of the fingers 5A and 5B which of course have some flexibility.

In these figures it may also be seen that there is provision for modifying the distance between centers of the shafts 6A and 6B by moving the respective bearings 27A and 27B that they carry to enable adjustment of the separation between the fingers 5A and 5B and widening or narrowing of access to the vertical space or opening or closing of the space 3.

The invention claimed is:

1. A huller device for hulling bunches of fruits and stalks after a harvest and separating the fruits from the stalks, the huller device comprising:

two shaking units disposed side by side and defining a vertical space therebetween into which the bunches are intended to be directed by gravity, each of said shaking units including a respective first horizontal shaft and a respective series of parallel fingers suspended from said first horizontal shaft, said first shafts being mutually parallel;

a collector disposed under said two shaking units and configured to collect fruits and stalks; and drives configured to drive the stalks, said drives including two second shafts being parallel to said first shafts and two sets of parallel rotating disks, each of said sets of rotating disks being mounted on a respective one of said second shafts;

each of said second shafts being disposed relative to a respective one of said shaking units to cause said rotating disks of each of said drives to pass between said fingers of a respective one of said shaking units and to cause part of said rotating disks to penetrate into said vertical space, said part of said rotating disks disposed in said vertical space having a downward movement.

2. The huller according to claim 1, wherein each of said fingers includes:

an area at which said finger is suspended from said shaft, an obliquely oriented segment starting from said area and directed downward and toward said vertical space, forming a hopper of one of said shaking units for receiving the bunches, and a vertically oriented segment in line with said obliquely oriented segment.

3. The huller device according to claim 1, which further comprises a drive connected to said two first shafts and enabling transmission to said two first shafts of an oscillatory pivoting movement to drive said fingers in an oscillatory pendular movement.

4. The huller device according to claim 1, wherein said fingers of each of said shaking units are regularly spaced apart.

5. The huller device according to claim 1, which further comprises an adjusting device configured to adjust a distance between centers of said first shafts to enable adjustment of a separation of said fingers of one of said shaking units relative to said fingers of the other of said shaking units.

6. The huller device according to claim 1, which further comprises:

a chassis;

each of said fingers including a lower free end part formed of a material having spring qualities and a remaining part formed of a hard and rigid material; and fixation devices connecting said lower free end parts to said chassis.

7. The huller device according to claim 6, wherein said fixation devices are movable to enable a tension adjustment of said fingers.

8. The huller device according to claim 1, which further comprises:

a chassis;

said fingers being formed of a hard and rigid material and having lower free end parts; and spring-loaded connections connecting said lower free end parts to said chassis in a direction facing away from said vertical space.

9. A harvesting machine, comprising a huller device according to claim 1.

10. The huller device according to claim 1, wherein each of said rotating disks has a circular shape and teeth.

11. The huller device according to claim 1, wherein each of said rotating disks has an oblong shape.

12. The huller device according to claim 1, wherein said second shafts are offset vertically.

13. The huller device according to claim 1, wherein said sets of rotating disks are offset angularly.

* * * * *